(12) United States Patent
Shvedov

(10) Patent No.: US 10,899,611 B1
(45) Date of Patent: Jan. 26, 2021

(54) METHOD OF PRODUCING HYDROGEN THROUGH LASER ABLATION

(71) Applicant: New World Energy LLC, Brownsburg, IN (US)

(72) Inventor: Vladlen G. Shvedov, Canberra (AU)

(73) Assignee: New World Energy LLC, Brownsburg, IN (US)

(*) Notice: Subject to any disclaimer, the term of this patent is extended or adjusted under 35 U.S.C. 154(b) by 0 days.

(21) Appl. No.: 16/569,115

(22) Filed: Sep. 12, 2019

(51) Int. Cl.
*C01B 3/08* (2006.01)
*B01J 19/12* (2006.01)

(52) U.S. Cl.
CPC ............... *C01B 3/08* (2013.01); *B01J 19/121* (2013.01); *B01J 2219/089* (2013.01); *B01J 2219/12* (2013.01)

(58) Field of Classification Search
CPC ..... C01B 3/08; B01J 19/121; B01J 2219/089; B01J 2219/12
USPC ........................................ 204/157.52, 157.41
See application file for complete search history.

(56) References Cited

U.S. PATENT DOCUMENTS

| | | | |
|---|---|---|---|
| 4,358,291 A | 11/1982 | Cuomo et al. | |
| 5,867,978 A | 2/1999 | Klanchar et al. | |
| 6,440,385 B1 | 8/2002 | Chaklader | |
| 6,582,676 B2 | 6/2003 | Chaklader | |
| 2002/0081235 A1* | 6/2002 | Baldwin | B01J 19/0006 422/105 |
| 2009/0010837 A1* | 1/2009 | Yabe | B01J 19/127 422/186 |

(Continued)

FOREIGN PATENT DOCUMENTS

PA 2002014213 A2 2/2002
PA 2005097670 A1 10/2005

OTHER PUBLICATIONS

Escobar-Alarcon et al, "Hydrogen production by laser irradiation of metals in water under an ultrasonic field: A novel approach," International Journal of Hydrogen Energy 44 (2019) 1579-1585 (Year: 2019).*

(Continued)

*Primary Examiner* — Nicholas A Smith
*Assistant Examiner* — Colleen M Raphael
(74) *Attorney, Agent, or Firm* — Woodard, Emhardt, Henry, Reeves & Wagner, LLP

(57) ABSTRACT

The process describes the capability of solid-state metals to oxidize in water to produce hydrogen when stimulated by laser. The solid-state metals with an adherent surface layer of the oxide component is introduced into water or another suitable oxidizer. The metal-oxidizer reaction to form hydrogen is initiated and maintained by a laser periodically/continually ablating the metal. The energy, pulse duration and wavelength of the laser may be tailored to control the rate of reaction of the source material with the oxidizer, and thereby control the rate of formation of hydrogen. Application of energy produced by such method may include powering large scale commercial and residential energy companies, providing sustainable and continuous fuel for intergalactic missions, providing an alternative fuel sources for on-board hydrogen-powered vehicles and smaller scale applications such as emergency generators.

18 Claims, 2 Drawing Sheets

(56) References Cited

U.S. PATENT DOCUMENTS

2010/0196192 A1* 8/2010 Liu ................... B01J 19/121
420/463
2016/0040309 A1* 2/2016 Kumano ............ B01J 19/123
204/242

OTHER PUBLICATIONS

Lee et al, "Nanocatalyst fabrication and the production of hydrogen by using photon energy,"International Journal of Hydrogen Energy 34 (2009) 1835-1843. (Year: 2009).*
Lee et al, "Hydrogen production with a solar steam-methanol reformer and colloid nanocatalyst,"International Journal of Hydrogen Energy 35 (2010) 118-126. (Year: 2010).*
Escobar-Alarcon, L. et al., "Hydrogen production by ultrasound assisted liquid laser ablation of Al, Mg and Al—Mg alloyes in water." Applied Surface Science 478 (2019) 189-196. 9 pages.
Vailionis, Arturas, et al. "Evidence of superdense aluminium synthesized by ultrafast microexplosion." Nature Communications 2 (2011): 445. 6 pages.
McCafferty, E., "Sequence of steps in the pitting of aluminum by chloride ions", Corrosion Science, 45, 1421-1438 (2003). 18 pages.
Petrovic, John, and George Thomas. "Reaction of Aluminum with Water to Produce Hydrogen." US Department of Energy (Version 2—2010). 27 pages.

* cited by examiner

METHOD OF PRODUCING HYDROGEN THROUGH LASER ABLATION

BACKGROUND

Hydrogen may be used as a power source in fuel cells and as a fuel for hydrogen-powered applications and devices. The applications may include but are not limited to on-board hydrogen-powered engines, commercial and residential power generators and devices that may benefit from highly efficient sustainable energy sources.

Traditional energy resources, mostly represented by fossil fuel in form of oil, gas and coal, are the foundation of modern civilization. However, these energy resources are limited and will soon be depleted due to the environmental scarcity. The challenges of scarcity together with deleterious environmental effects from burning fossil fuels has caused a growing need to discover and develop alternative sources of fuel, especially from common and prevalent materials.

Thus, there is a need for improvement in this field.

SUMMARY

The proposed solution is to produce hydrogen at place in a practically required delivery rate for utilizing as a fuel for the portative applications.

Hydrogen is a readily available substance and chemical naturally present in the world. Hydrogen is a diatomic gas that is non-toxic and environmentally friendly at standard temperature and pressure. Naturally hydrogen is present in the molecular form as a compound of other chemical substances such as oxygen, carbon, and many others. It is a main component of water and locked up in gigantic quantities in organic and nonorganic matter. It can be released by physical processes, chemical reactions or both, and used the same way as a traditional fuel. Moreover, hydrogen is even more preferred to combustion reactions, as it has three times the energy density per weight as methane or gasoline. Thus, hydrogen can be effectively used to run a combustion engine or to generate heat and electricity. The use of hydrogen in such a way is environment friendly as it produces no carbon or methane emissions but only forms water.

The ability to efficiently extract hydrogen from a chemical substance is one of the main challenges of using hydrogen as a fuel. The traditional method to produce hydrogen from water is electrolysis. Although the efficiency of water electrolysis is up to 80%, this method requires the electricity to drive the reaction that may come from stationary power plants. While the water electrolysis relies upon large-scale electricity generation, it is inadequate for mobile power supply needs. Usage of hydrogen from this process requires producing it near the power plants and then delivery by truck from suppliers to hydrogen filling stations. The main difficulty facing the use of any hydrogen production methods includes chiefly hydrogen delivery and storage on filling stations and on board the vehicle.

Hydrogen gas is dangerous due to low ignition and high energy of hydrogen combustion, and because it tends to easily leak out of the tanks. The storage requires hydrogen to be highly compressed in specialized tanks, typically equipped with cryogenic cooling. The storage requirement makes the use of gaseous hydrogen in vehicles problematic and even almost impossible for much smaller devices.

Thus, there is a need for hydrogen generation processes and hydrogen fuel cells for vehicles and other portable appliances that avoid the inherent problems with extraction and storage.

In order to address the issues and risks associated with hydrogen production and transportation while using it as a fuel, all the processes of hydrogen extraction from compounds should be on board of vehicles or portable appliances. The most reasonable way to achieve such a result is chemical reactions of the hydrogen-contained compounds with some materials to release the hydrogen directly "in place". As mentioned above, water is one of the best but not a single candidate on the role of the hydrogen-contained compounds because enormous quantities of hydrogen are locked in organic and inorganic chemical substances.

On the other hand, a broad range of metals of electrochemical series, from lithium to tin, can substitute and release hydrogen from active inorganic substances such as acids, hydroxides or water thought the displacement reactions. The reactions might be effectively utilized to power fuel cell devices for many portable applications including possible usage as for hydrogen-powered vehicles.

However, there are not many cheap and abundant metals available. Many potential metals are rare or produce toxins when reacted. Most available, cheap and environment-friendly metals are magnesium, aluminum and zinc. These metals can react even with a cold water producing hydrogen without presenting any specific catalyzers or additional compounds such as acids or hydroxides. Typically, at the standard conditions, the reaction is very weak because of a protective surface oxide layer usually covered the metals.

At the present, the key to inducing and maintaining the reactions between metals and water is the continual disruption and removal of the oxide layer from the metal. Thus, all metal-based approaches propose chemical or mechano-chemical, or physical methods to remove the adhered layer of oxides, thereby allowing the reaction with water to occur. Most of them are focused on aluminum as this metal. Aluminum is the most abundant metal in the crust of Earth (about 8% by mass), well tolerated by plants and animals, and much cheaper than other active metals.

Particularly, a number of methods describe the use of water-soluble inorganic compounds such as sodium hydroxide (NaOH) or salts (NaCl and KCl) that can produce localized pitting and rupture of the alumina layer on aluminum particles.

Others propose to use powdered mixtures of aluminum and water insoluble materials such as aluminum oxide ($Al_2O_3$) or aluminum powders ball-milled in water or even to use molten aluminum alloys sprayed to water and allowing water coming into direct contact with the aluminum metal.

Since the reaction proceeds at the metal surface, the rate of hydrogen production is related to the surface area of aluminum in contact with water. The established practical way to increase this surface is to use a powdered aluminum, also its mixtures with water have a low kinetic reaction rate for vehicular applications reaction (the maximum value in the literature is about $2 \times 10^{-4}$ g $H_2$/sec/g of Al).

Together with the low kinetic reaction rate and high volumetric density of metallic powders, the main issue of the previous methods of chemical or mechanochemical disruption of the adherent oxide layers of aluminum is control of the process. The reaction runs to completion once started. This would require some additional buffer or tank to accumulate the excess hydrogen with a nominal pressure to meet safety requirements.

The present disclosure proposes a controllable technique to efficiently extract hydrogen from hydrogen-contained substances that comprises a solid-state metal plate capable, under special conditions of the laser ablation, reacting with the substances realizing hydrogen.

The inventor's approach is not limited by water or aqueous solutions and can use other solvents for the hydrogen-contained materials, for example organic liquids such as ethanol. In the case of using water as a source of hydrogen, the approach is not critical to the purity of water and can work with very large amounts of chemical materials solved in water to maximize production rates of hydrogen. The operation wavelength of the laser to operate in aqueous solution is chosen at a spectral rate from 400 nm to 800 nm to minimize the light absorption by water. Moreover, our method does not require a powerful laser also as the metal ablation process depends on pick energy of pulse. For instance, any commercial pulse laser with average power from 100 mW with pulses at the mJ range for 50 fs-10 ms pulse width with the repetition rates at 1-1000 kHz is suitable for that application.

Besides, by controlling the number of laser pulses and its energy, a fine control of the production of hydrogen through reactions between metals and water-based active liquids can be achieved including the capability to proceed or stop the reaction at will. The hydrogen produced by such reactions can be directly used as a fuel for portable applications. The proposed hydrogen production technique might be used as a secure hydrogen generator for on-board hydrogen-powered vehicles without needing a buffer or container for retaining of hydrogen.

The laser may initiate and periodically control the speed of the reaction running to completion once started when water soluble materials to promote the reaction (such as NaOH, NaCl or $H_3PO_4$) are utilized or may operate continuously in water with neutral pH to promote production of the required amount of hydrogen.

DESCRIPTION OF THE SELECTED EMBODIMENTS

Figure 1:
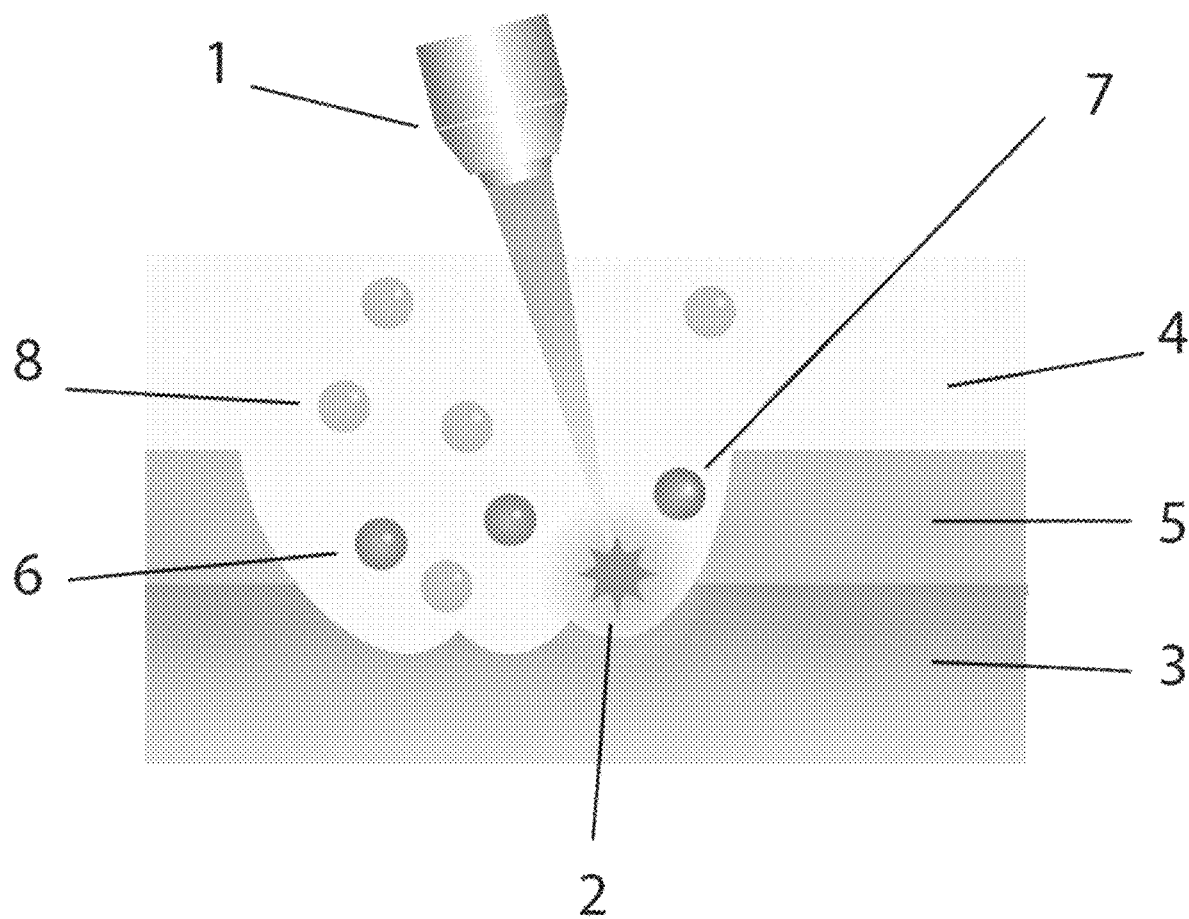
FIG. 1 is an illustrative view of the release of aluminum during the aluminum-oxidizer reaction stimulated by laser.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

In a specific embodiment, the metal is aluminum. It is understood that any other active metals and alloys may be used.

A plate made from aluminum is introduced into a reaction chamber to produce hydrogen and heat. The reaction chamber is a vessel with an optically transparent window at least on one side. The chamber contains water with neutral pH, mixture of water with a passivation-preventing agent or other solvents, such as ethanol. The passivation preventing agent is preferably NaOH, NaCl or $H_3PO_4$. A laser beam is focused on the surface of the aluminum plate through the transparent window in order to ablate the aluminum metal, and to initiate and control hydrogen and heat production. The position of the beam spot on the aluminum plate can be dynamically changed by an additional mechanical or opto-mechanical device. The operation wavelength of the laser can be variated at a spectral rate from 400 nm to 800 nm (transparency window of water). Changing the laser operation rate, frequency of laser pulses, pulse energy or pulse duration leads to a direct change in the rate of hydrogen product. For instance, for a given surface area, putting the same laser energy in a much shorter pulse leads to increasing of the ablation area and increasing the rate of hydrogen product. The hydrogen production can be initiated or stopped immediately by turning the laser on or off, respectively.

Generally, the technology proposed for the metal to be vaporized is close to the recent laser cleaning technology based on laser ablation when a part of material is disrupted or removed by illumination with a laser beam.

Typically, the removing achieved through laser ablation allows the selective removal of the surface contaminants with little impact on the substrate as molecular bonds in the oxide layer with a low ablation threshold are broken and ejected from the metallic surface. However, this strategy is modified in the inventor's approach for the specific task of metal-water reaction to produce hydrogen. The oxide layer of aluminum is represented mostly as $\alpha$-$Al_2O_3$ with a very large bandgap of 9.8 eV. Therefore, a simple vaporizing of the oxide layer by the laser beam requires an energy density several times higher than the strength of many common materials. While there is no need to minimize impact of laser pulses on the aluminum under the oxide layer, the best strategy is to ablate the aluminum through the transparent oxide. This causes the aluminum metal to vaporize and form a plasma, which quickly expends out generating a shock wave that destroys the protective oxide layer. The plate constituents, aluminum and $Al_2O_3$ oxide become mixed in the hot plasma and sprayed to the surrounding water initiating the reaction of hydrogen production. The more hot metal nanoparticles sprayed to the liquid the more hydrogen produced. Potentially the speed of ablation and the amount of particles injected to the liquid is not limited allowing the production of the desired quantity of hydrogen.

FIG. 1 explains the initiation of metal-oxidizer reaction using a laser 1 for a laser ablation process 2 of a metal alloy 3 in an oxidizing liquid 4, leading to the removal of an adherent layer of a metal oxide 5 and to formation of spatially separated particles of the metal oxide 6 and metal particles 7. The vaporized metal particles 7 together with released oxide-free aluminum alloy 3 react with the oxidizing liquid 4 producing hydrogen 8.

Figure 2:
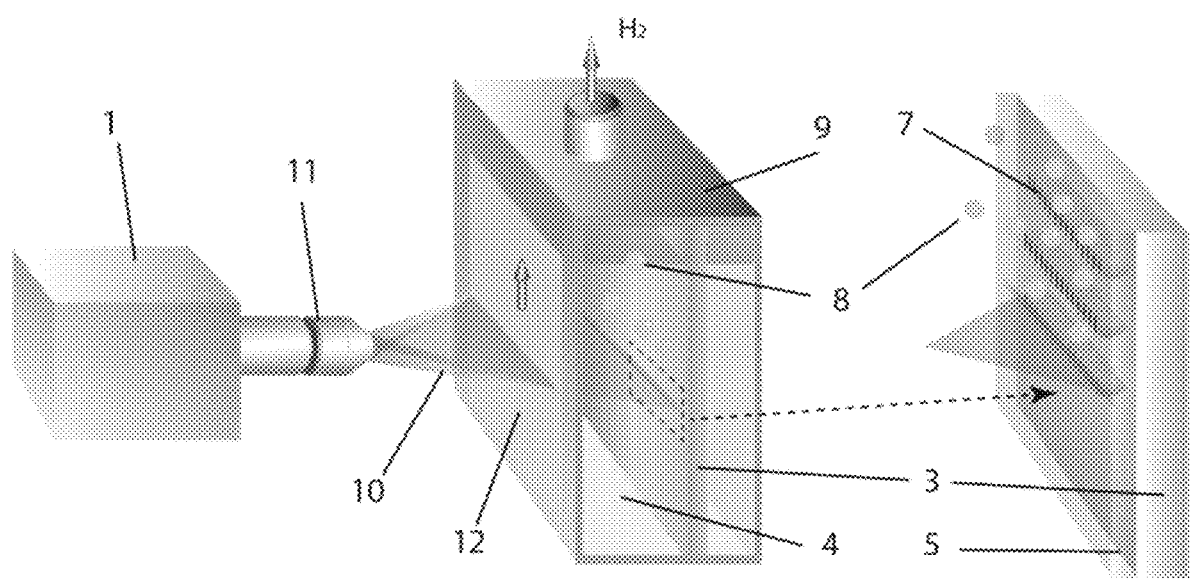
FIG. 2 is a perspective view of the hydrogen production process.

FIG. 2 represents a hydrogen production chamber 9. The laser 1 generates a laser pulse 10 directed by a focusing optical system 11. The beam continuously ablates the surface of a metal alloy 3 in oxidizing liquid 4 through a glass window 12 vaporizing metal particles 7 and removing of an adherent layer of the metal oxide 5. This initiates the metal-solvent reaction and allows one to control of the rate of hydrogen 8 producing in the chamber 9.

In certain embodiments, the broad range of laser pulses 10 can be used to ablate the aluminum metal under the oxide layer of the metal alloy 3 stimulating and enhancing the aluminum-water reaction for hydrogen production in the chamber 9:

$$2Al + aH_2O + bXOH + k = 3H_2 + Y\{2Al, bX, (a+b)O, (2a+b-6)H\} + k, \quad (1)$$

where $2a+b \geq 6$, a and b are numbers of the water molecules 6, 13 and hydroxide molecules 7, 14, respectively; X is an alkali metal cation; k is a catalyzer (for instance, NaCl or KCl); and Y is a complex chemical compound which may comprise atoms of Al, X, O and H 3, 15.

It is also possible to dramatically enhance a reaction of aluminum and some acids similar to (1):

$$2Al + aH_2O + cH_nZ + k = 3H_2 + aH_2O + Y\{2Al, cZ\} + k, \quad (2)$$

where $c \times n = 6$; n is a number of hydrogen atoms in the acid, Z is a base of the acid. Some of such reactions without a catalyzer are:

$$2Al + 3H_2O = Al_2O_3 + 3H_2 \quad (3)$$

$$2Al + 4H_2O = 2AlO(OH) + 3H_2 \quad (4)$$

$$2Al + 6H_2O = 2Al(OH)_3 + 3H_2 \quad (5)$$

$$2Al + 2NaOH + 6H_2O = 2NaAl(OH)_4 + 3H_2 \quad (6)$$

$$2Al + 2NaOH + 2H_2O = Na_2Al_2O_4 + 3H_2 \quad (7)$$

$$2Al + 6NaOH + xH_2O = Na_6Al_2O_6 + xH_2O + 3H_2 \quad (8)$$

$$2Al + 6HCl + xH_2O = 2AlCl_3 + xH_2O + 3H_2 \quad (9)$$

$$2Al + 2H_3PO_4 + xH_2O = 2AlPO_4 + xH_2O + 3H_2 \quad (10)$$

The last reaction is very perspective as it uses nontoxic and the weak under standard conditions phosphoric acid, which can be solved in other to water solvents (for example ethanol) to effectively produce hydrogen by the act of laser ablation:

$$2Al + 2H_3PO_4 + xC_2H_5OH = 2AlPO_4 + xC_2H_5OH + 3H_2 \quad (11)$$

Note, all the reactions (3)-(11) utilize the same amount of aluminum reacted and produce equal amount of hydrogen. However, the water-based reactions (3)-(7) require different amounts of water and, in fact, the purity of water plays no sensitive role in the process of hydrogen production by laser ablation. The others, (8)-(11) include the water or other liquid only as a solvent, but the reactions occur between aluminum and the active component such as NaOH, HCl or $H_3PO_4$. The probability of the particular reaction to occur and the speed of the reaction mostly depend on the temperature in the reaction zone where the metal is directly contacting with the liquid 4. In the process of laser ablation, this zone is predominantly close to the ablation spot and, in fact, the laser can control both the type of reaction and the efficiency of hydrogen production. For instance, the very short laser pulses at femtosecond range typically produce minimal total heating with a maximal ablation efficiency by pulse energy. At this pulse duration range, the laser can support and regulate a speed (by readjusting the pulse frequency) of hydrogen production at room temperature rate of reactions (4)-(6) with a high level of hydration. Longer pulses with higher energy by pulse may stimulate and control reactions to temperatures far higher of the melting point of aluminum, such as (3) and (7). The reactions with acids (8)-(11) can be provided at a wide range of temperature and can be regulated directly by changing the laser parameters.

From the freezing point of water up to about 300° C., the reactions (5)-(6) are the most thermodynamically favorable, while from 300 to 500° C., (4) and (7) are most favorable. Above approximately 500° C., (3) is the most favorable reaction. As for the reactions (8)-(11), they can occur at the wide range of temperatures, far past the melting point of aluminum (660° C.), with the intensity growing up as the temperature increases. The specific of these reactions is that they do not critically depend on the state of matter of the metal, solvent or oxidizer. They can be at any state from solid and liquid to gas and plasma. For this reason, they are the most interesting in the process of laser ablation at a high power laser pulse where the temperature in the reaction zone may reach thousands of Kelvins.

The experimental hydrogen production rates can be estimated in terms of the quantity of material, that is, g $H_2$/g of Al per unit time. Practically required delivery rate for commercial usage of an 80 kW vehicular fuel cell is 1.6 g $H_2$/g. The traditional kinetics of aluminum-water reactions (at least those presently documented in the literature) give maximum reported value as only $2 \times 10^{-4}$ g $H_2$/s/g of Al that required at least 8 kg of aluminum powder to be reacted for the production 1.6 g $H_2$/s. These small production rates may be explained by the natural and physical chemical processes of the aluminum-water reaction in traditional methods. These reasons are the packing density of the solid metal particles, the small surface area contacting with water and low temperature of the reaction.

The proposed process is free from such principal restrictions. The speed of the aluminum-solvent reaction stimulated by laser 1 strongly depends on the amount of vaporized aluminum particles 7 as well as on the area of destroyed oxide layer by the act of laser ablation 2. The "vaporizing" nature of laser ablation allows the aluminum to react with the liquid not only as a solid-state material but as a plasma, dramatically increasing the surface area of reaction resulting in almost unlimited speed of the reaction. Increasing the pulse energy, repetition rate and ablation area one can easily reach the required 1.6 g $H_2$/s (18 liters/s) by ablation only 7 g Al/s (that means 0.23 g $H_2$/s/g Al).

As all the aluminum-solvent reactions (1) and (2) are highly exothermic, at the peak hydrogen rate for an 80 kW fuel cell, the reaction would generate a heating power of about 225 kW. This heat generation could be managed to the electricity by thermoelectric conversion to supply the laser source.

The invention claimed is:

1. A method, comprising:
   immersing a metal in a liquid, wherein the metal includes a metal surface covered by an oxide layer;
   shining a laser beam through the oxide layer at a frequency where the oxide layer is transparent to the laser beam;
   ablating the metal surface underneath the oxide layer by shining the laser beam on the metal surface to vaporize and form a plasma from the metal surface; breaking up the oxide layer with a shock wave formed by said ablating the metal surface underneath the oxide layer; and collecting hydrogen resulting from said ablating.

2. The method of claim 1, wherein the metal includes aluminum.

3. The method of claim 1, wherein the metal includes an aluminum alloy.

4. The method of claim 1, wherein the liquid includes liquid water.

5. The method of claim 1, wherein the metal is in a solid state.

6. The method of claim 1, further comprising:
consuming the hydrogen at a location of hydrogen production.

7. The method of claim 1, wherein said ablating includes emitting the laser beam with a wavelength between 400 nm and 800 nm.

8. The method of claim 1, further comprising:
changing the position of the laser beam to ablate a different portion of the oxide layer.

9. The method of claim 1, wherein said ablating includes emitting a laser beam with a minimum power of 100 mW.

10. The method of claim 1, wherein said ablating includes pulsing the laser beam.

11. The method of claim 10, wherein said pulsing includes pulsing with a duration between 50 fs to 10 ms.

12. The method of claim 11, wherein said pulsing the laser beam occurs at a frequency between 1 kHz to 1000 kHz.

13. The method of claim 1, further comprising:
treating the liquid with a passivation preventing agent.

14. The method of claim 13, wherein the passivation preventing agent includes NaOH, NaCl, or $H_3PO_4$.

15. The method of claim 1, further comprising:
retaining the liquid in a reaction chamber.

16. The method of claim 1, wherein:
said ablating includes emitting the laser beam with a wavelength between 400 nm and 800 nm;
said ablating includes emitting a laser beam with a minimum power of 100 mW;
said ablating includes pulsing the laser beam;
said pulsing includes pulsing with a duration between 50 fs to 10 ms; and
said pulsing the laser beam occurs at a frequency between 1 kHz to 1000 kHz.

17. The method of claim 16, wherein:
the metal includes aluminum;
the liquid includes liquid water; and
the oxide layer includes aluminum oxide.

18. The method of claim 1, wherein:
the metal includes aluminum;
the liquid includes liquid water; and
the oxide layer includes aluminum oxide.

\* \* \* \* \*